United States Patent
Araki et al.

(10) Patent No.: US 12,334,695 B2
(45) Date of Patent: Jun. 17, 2025

(54) ROTARY CONNECTOR DEVICE

(71) Applicants: FURUKAWA ELECTRIC CO., LTD., Tokyo (JP); FURUKAWA AUTOMOTIVE SYSTEMS INC., Inukami-gun (JP)

(72) Inventors: Masaya Araki, Inukami-gun (JP); Satoshi Kitao, Inukami-gun (JP)

(73) Assignees: FURUKAWA ELECTRIC CO., LTD., Tokyo (JP); FURUKAWA AUTOMOTIVE SYSTEMS INC., Inukami-gun (JP)

(*) Notice: Subject to any disclaimer, the term of this patent is extended or adjusted under 35 U.S.C. 154(b) by 377 days.

(21) Appl. No.: 18/096,496

(22) Filed: Jan. 12, 2023

(65) Prior Publication Data

US 2023/0170656 A1 Jun. 1, 2023

Related U.S. Application Data

(63) Continuation of application No. PCT/JP2021/025012, filed on Jul. 1, 2021.

(30) Foreign Application Priority Data

Jul. 13, 2020 (JP) ................................. 2020-120064

(51) Int. Cl.
*H01R 35/00* (2006.01)
*H01R 35/02* (2006.01)
*H01R 35/04* (2006.01)

(52) U.S. Cl.
CPC ........... *H01R 35/025* (2013.01); *H01R 35/04* (2013.01)

(58) Field of Classification Search
CPC ................................. H01R 35/04; H01R 43/00
See application file for complete search history.

(56) References Cited

U.S. PATENT DOCUMENTS 1,174,942 A * 3/1916 Bache ..................... F16C 33/24
                                                   292/DIG. 58
5,413,492 A    5/1995 Obala
(Continued)

FOREIGN PATENT DOCUMENTS

| JP | 02-139875 U | 11/1990 |
| JP | 2002-218639 | 8/2002 |
| WO | WO 2014/157233 | 10/2014 |

OTHER PUBLICATIONS

Written Opinion for corresponding International Application No. PCT/JP2021/025012, Jan. 26, 2023.
(Continued)

*Primary Examiner* — Phuong Chi Thi Nguyen
(74) *Attorney, Agent, or Firm* — Mori & Ward, LLP

(57) ABSTRACT

A rotary connector device includes a first case, a second case, an electrical cable, and a stopper structure. The stopper structure includes a movable member, a rotation restricting portion, and a guide portion. The movable member is movable relative to the second case between a first radial position and a second radial position in a radial direction. The rotation restricting portion is provided at the first case and contactable with the movable member in a circumferential direction to restrict a relative rotation of the first case and the second case in a state where the movable member is at the second radial position. The guide portion is provided at the first case and contactable with the movable member to guide the movable member toward the first radial position.

13 Claims, 12 Drawing Sheets

(56) References Cited

U.S. PATENT DOCUMENTS

| | | | | |
|---|---|---|---|---|
| 6,572,393 B2* | 6/2003 | Kawamura | ............ | B60R 16/027 |
| | | | | 439/164 |
| 6,644,978 B2* | 11/2003 | Araki | .................... | H01R 35/025 |
| | | | | 439/15 |
| 11,909,149 B2* | 2/2024 | Kitao | ...................... | H02G 11/02 |
| 2008/0113506 A1* | 5/2008 | Ohtsuka | ............ | H01L 21/76873 |
| | | | | 438/653 |
| 2009/0158585 A1* | 6/2009 | Yajima | ................. | H01R 35/025 |
| | | | | 29/874 |

OTHER PUBLICATIONS

International Search Report for corresponding International Application No. PCT/JP2021/025012, Aug. 31, 2021.
Extended European Search Report for corresponding EP Application No. 21841656.8-1009, Nov. 17, 2023.
Japanese Office Action for corresponding JP Application No. 2022-536248, Nov. 19, 2024 (w/ English machine translation).
Korean Office Action for corresponding KR Application No. 10-2023-7004596 Aug. 7, 2024 (w/ English machine translation).
Japanese Office Action for corresponding JP Application No. 2022-536248, Sep. 3, 2024 (w/ English machine translation).

* cited by examiner

ROTARY CONNECTOR DEVICE

CROSS-REFERENCE TO RELATED APPLICATIONS

The present application is a continuation application of International Application No. PCT/JP2021/025012, filed Jul. 1, 2021, which claims priority to Japanese Patent Application No. 2020-120064 filed Jul. 13, 2020. The contents of these applications are incorporated herein by reference in their entirety.

BACKGROUND

Technical Field

The technology disclosed herein relates to a rotary connector device.

Background Art

Japanese Unexamined Patent Publication JP 2002-218639 A describes rotary connectors used in vehicles.

SUMMARY

According to one aspect, a rotary connector device includes a first case, a second case, an electrical cable, and a stopper structure. The first case and the second case are rotatably provided relative to each other about a rotation axis and defines a cable housing space provided to surround the rotation axis. The electrical cable is provided in the cable housing space to be wound in a circumferential direction defined about the rotation axis. The stopper structure is to restrict a relative rotation of the first case and the second case to a predetermined rotation angle. The stopper structure includes a movable member, a rotation restricting portion, and a guide portion. The movable member is movable relative to the second case between a first radial position and a second radial position in a radial direction orthogonal to the rotation axis. The rotation restricting portion is provided at the first case and contactable with the movable member in the circumferential direction to restrict the relative rotation of the first case and the second case in a state where the movable member is at the second radial position. The guide portion is provided at the first case and contactable with the movable member to guide the movable member toward the first radial position.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
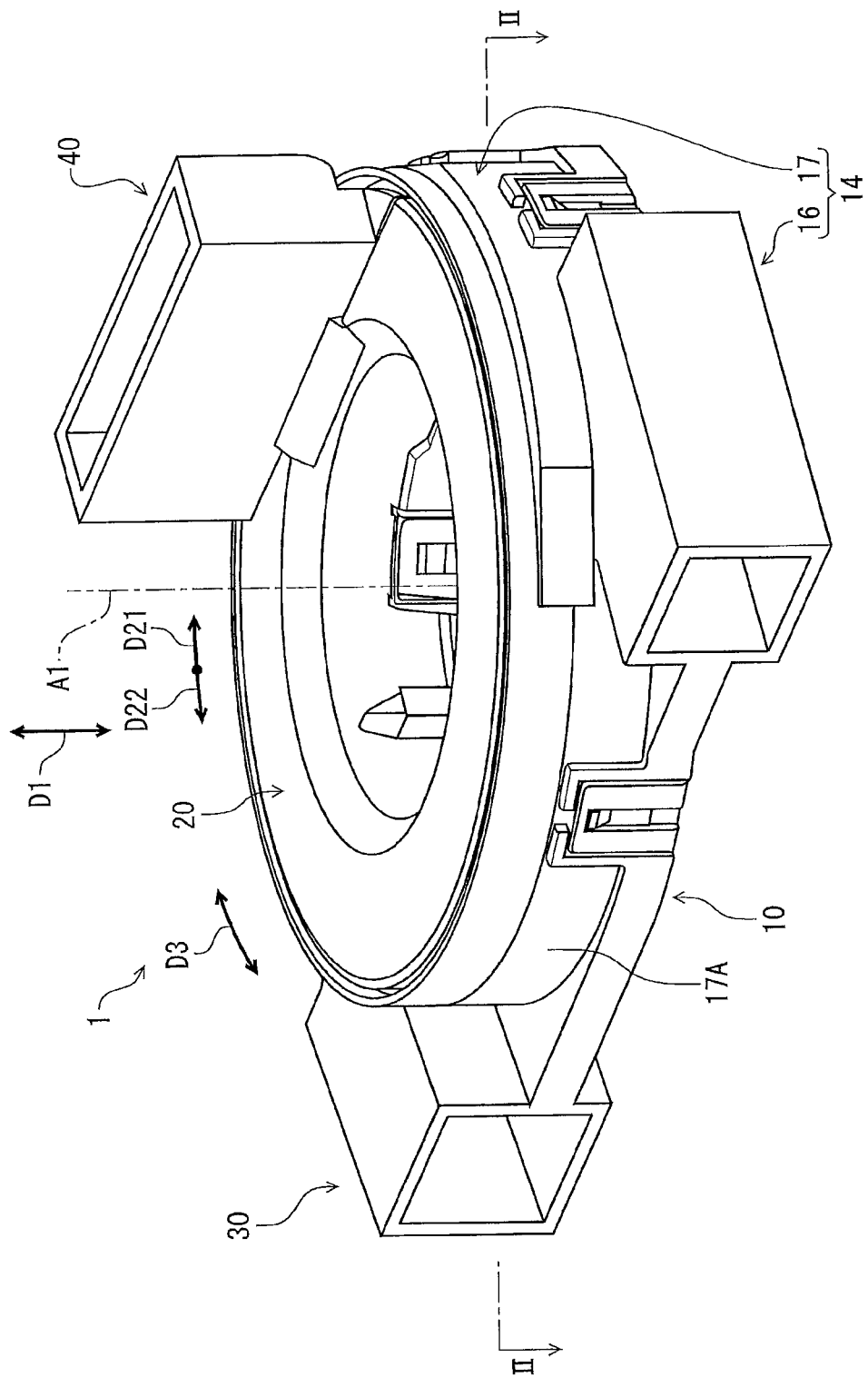
FIG. 1 is a perspective view of a rotary connector device according to an embodiment.

Embodiments will be described below with reference to the drawings. In the drawings, the same reference signs indicate corresponding or identical configurations.

As illustrated in FIG. 1, a rotary connector device 1 includes a first case 10 and a second case 20. The first case 10 and the second case 20 are rotatably provided relative to each other about a rotation axis A1. In the present embodiment, for example, the first case 10 is configured to be secured to a vehicle body. The second case 20 is configured to rotate with the steering wheel. That is, the first case 10 is a stator configured to be secured to the vehicle body. The second case 20 is a rotator that can rotate about the rotation axis A1 relative to the stator. Thus, the first case 10 can be referred to as a stator 10. The second case 20 may be referred to as a rotator 20. However, the first case 10 may be a rotator and the second case 20 may be a stator. That is, in the present application, the configuration provided in the stator 10 may be provided in the rotator 20, and the configuration provided in the rotator 20 may be provided in the stator 10.

The rotary connector device 1 includes a first electrical connector 30 and a second electrical connector 40. The first electrical connector 30 is attached to the first case 10. The first electrical connector 30 protrudes from the first case 10 in an axial direction D1 defined along the rotation axis A1. The second electrical connector 40 is attached to the second case 20. The first electrical connector 30 is configured to be electrically connected, for example, to electrical apparatuses (e.g., control device and battery) provided at the vehicle body. The second electrical connector 40 is configured to be electrically connected, for example, to an electric circuit such as a switch and the like of a steering wheel or an airbag device.

Figure 2:
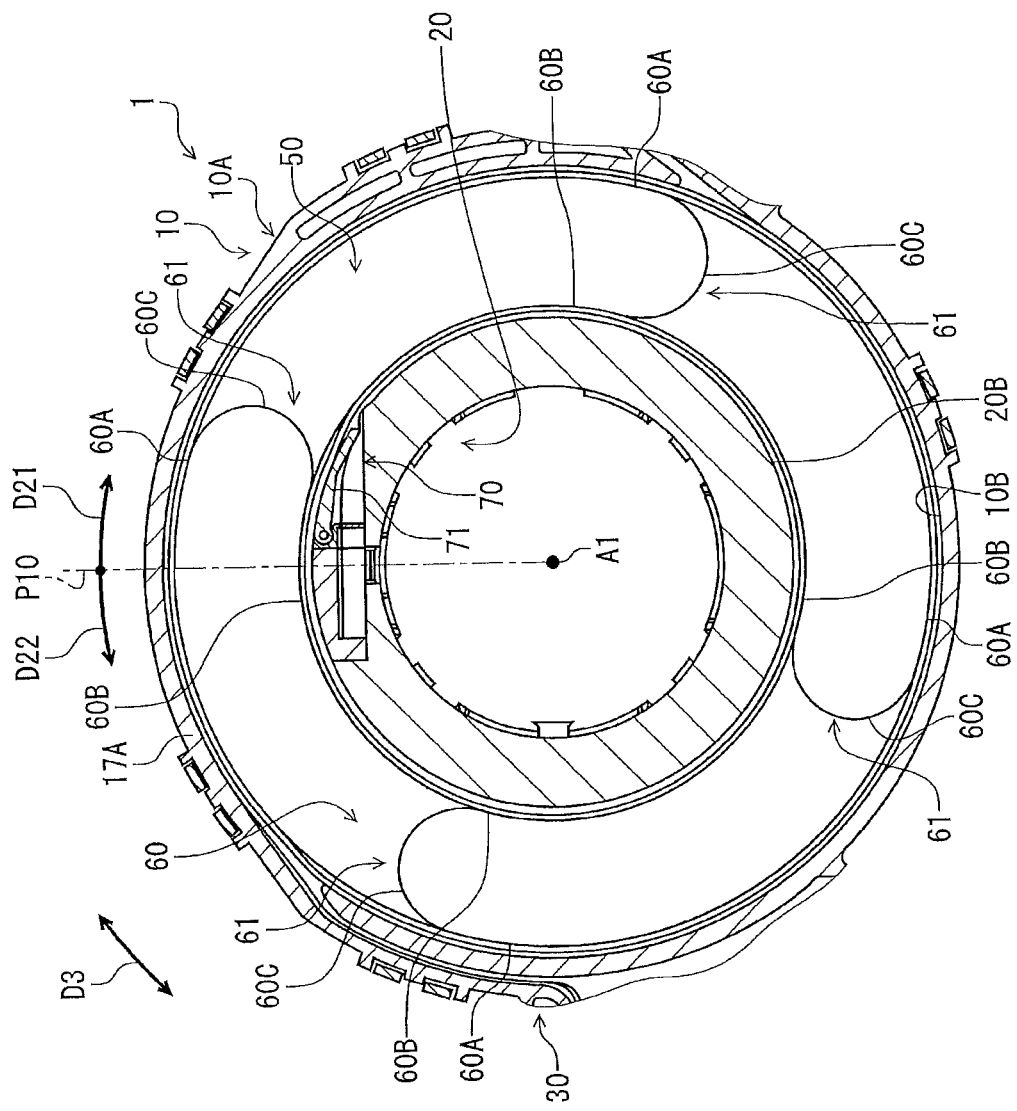
FIG. 2 is a cross-sectional view of the rotary connector device taken along line II-II of FIG. 1.

As illustrated in FIG. 2, the first case 10 and the second case 20 define a cable housing space 50 provided to surround the rotation axis A1. For example, the cable housing space 50 is annular and extends in a circumferential direction D3 relative to the rotation axis A1. The rotary connector device 1 includes an electrical cable 60. The electrical cable 60 is provided in the cable housing space 50 to be wound in the circumferential direction D3 defined about the rotation axis A1. The electrical cable 60 is electrically connected to the first electrical connector 30 and the second electrical connector 40 (FIG. 1). The electrical cable 60 is flexible and has a flat shape. The electrical cable 60 can also be referred to as a flexible flat cable. In the present embodiment, the electrical cable 60 includes a plurality of flat cables 61.

The first case 10 includes an inner peripheral surface 10B that partially defines the cable housing space 50. The second case 20 includes an outer peripheral surface 20B that is provided radially inwardly of the inner peripheral surface 10B and partially defines the cable housing space 50. The electrical cable 60 includes a first winding portion 60A, a second winding portion 60B, and an intermediate portion 60C. The first winding portion 60A is wound along the inner peripheral surface 10B of the first case 10. The second winding portion 60B is wound along the outer peripheral surface 20B of the second case 20. The intermediate portion 60C is provided between the first winding portion 60A and the second winding portion 60B and couples the first winding portion 60A to the second winding portion 60B.

The first winding portion 60A is electrically connected to the first electrical connector 30. The second winding portion 60B is electrically connected to the second electrical connector 40 (FIG. 1). The intermediate portion 60C is bending between the first winding portion 60A and the second winding portion 60B. The intermediate portion 60C has a curved shape that protrudes, for example, in a first rotational direction D21. Each of the plurality of flat cables 61 includes the first winding portion 60A, the second winding portion 60B, and the intermediate portion 60C.

The electrical cable 60 is provided in the cable housing space 50 such that rotation of the second case 20 relative to the first case 10 in the first rotational direction D21 decreases the length of the second winding portion 60B of the electrical cable 60 wound about the outer peripheral surface 20B. The electrical cable 60 is provided in the cable housing space 50 such that rotation of the second case 20 relative to the first case 10 in a second rotational direction D22 opposite to the first rotational direction D21 increases the length of the second winding portion 60B of the electrical cable 60 wound about the outer peripheral surface 20B. In other words, the electrical cable 60 is provided in the cable housing space 50 such that the rotation of the second case 20 relative to the first case 10 in the first rotational direction D21 increases the length of the first winding portion 60A of the electrical cable 60 wound about the inner peripheral surface 10B. The electrical cable 60 is provided in the cable housing space 50 such that the rotation of the second case 20 relative to the first case 10 in the second rotational direction D22 decreases the length of the first winding portion 60A of the electrical cable 60 wound about the inner peripheral surface 10B.

However, when the first case 10 and the second case 20 relatively rotate too much, for example, the electrical cable 60 may become loose and a state of the intermediate portion 60C of the electrical cable 60 may collapse.

Figure 3:
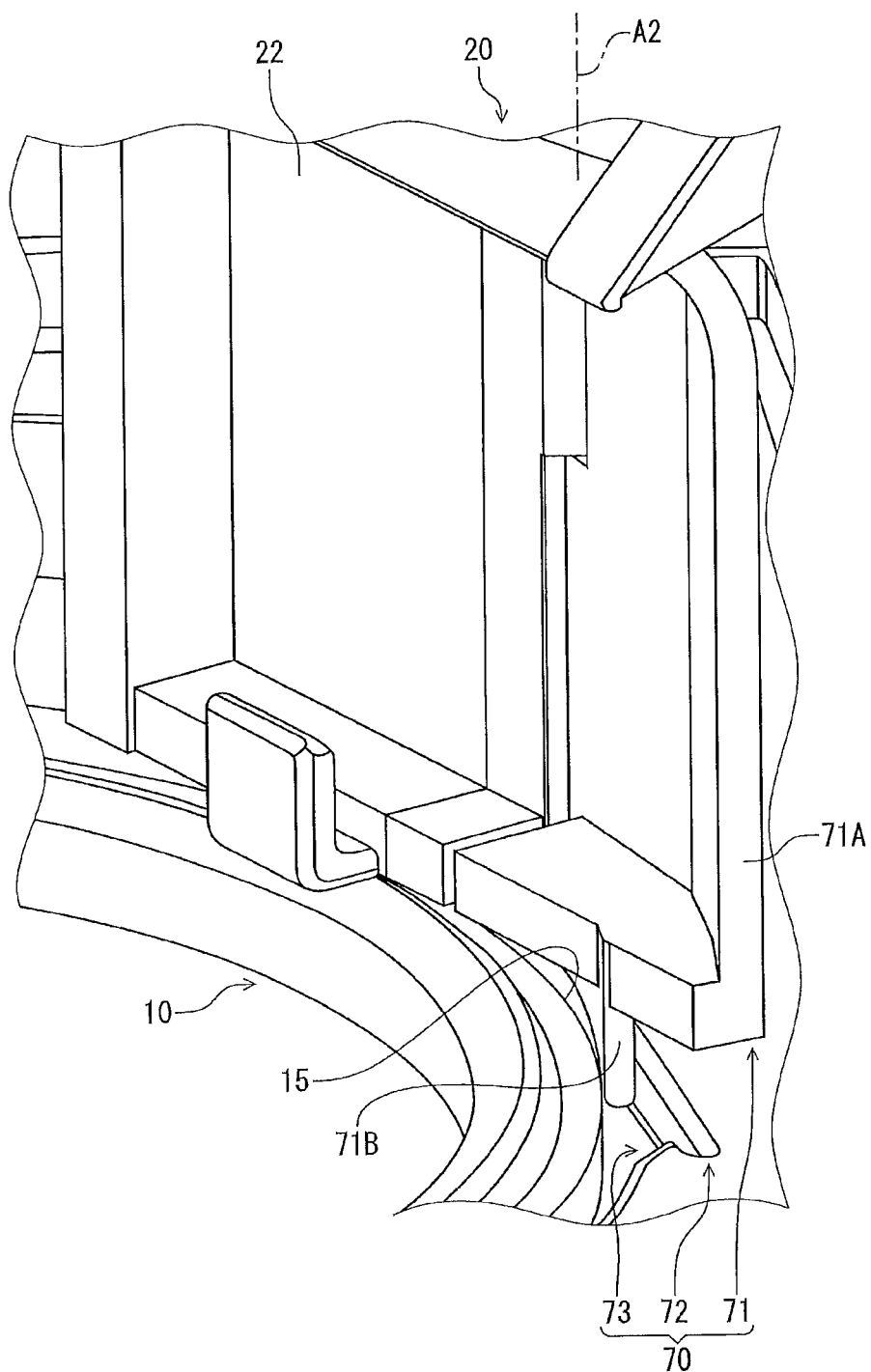
FIG. 3 is a perspective view of a stopper structure of the rotary connector device illustrated in FIG. 1.

Thus, as illustrated in FIG. 3, the rotary connector device 1 includes a stopper structure 70 configured to restrict the relative rotation of the first case 10 and the second case 20 to a predetermined rotation angle. The stopper structure 70 includes a movable member 71, a rotation restricting portion 72, and a guide portion 73. The movable member 71 is coupled to the rotator 20 rotatably about a stopper rotation axis A2. The rotation restricting portion 72 is provided at the first case 10. The guide portion 73 is provided at the first case 10. The rotation restricting portion 72 is provided at the stator 10. The guide portion 73 is provided at the stator 10. However, the movable member 71 may be rotatably coupled to the stator 10. The rotation restricting portion 72 may be provided at the rotator 20. The guide portion 73 may be provided at the rotator 20.

Figure 4:
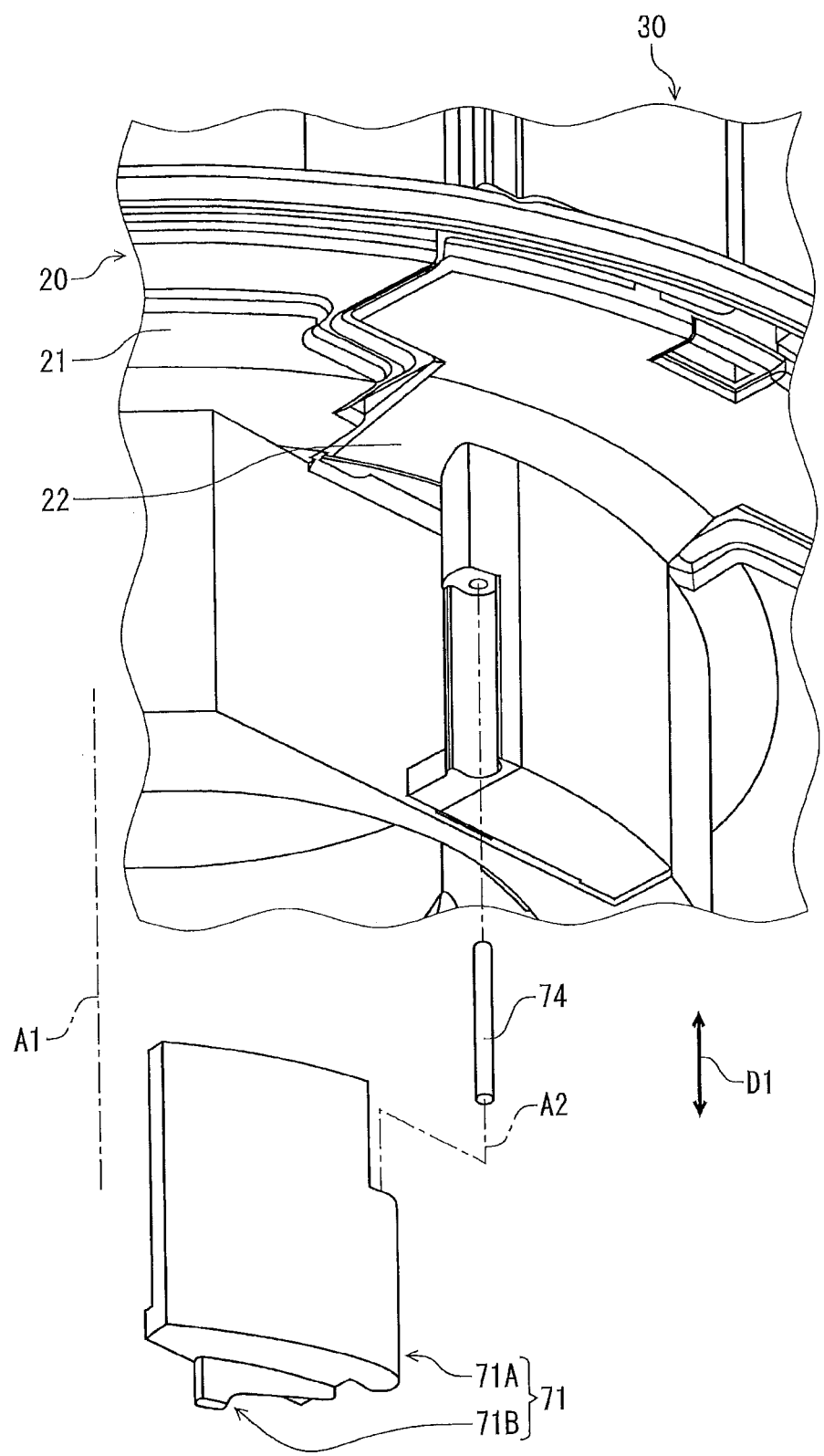
FIG. 4 is an exploded perspective view of the rotary connector device illustrated in FIG. 1.

As illustrated in FIG. 4, the second case 20 includes a second case main body 21 and a connector support portion 22. The connector support portion 22 is a separate member from the second case main body 21 and attached to the second case main body 21. The movable member 71 is coupled to the connector support portion 22 rotatably about the stopper rotation axis A2. A stopper main body 71A is coupled to the connector support portion 22 rotatably about the stopper rotation axis A2. The stopper structure 70 includes a pivot pin 74. The pivot pin 74 couples the movable member 71 to the second case 20 rotatably about the stopper rotation axis A2. The connector support portion 22 may be integrally provided with the second case main body 21, as a one-piece member. The pivot pin 74 may be integrally provided with one of the second case 20 and the movable member 71, as a one-piece member.

The movable member 71 includes the stopper main body 71A and a protruding portion 71B. The stopper main body 71A is coupled to the second case 20 rotatably about the stopper rotation axis A2. The protruding portion 71B protrudes from the stopper main body 71A in the axial direction D1 defined along the rotation axis A1. The stopper rotation axis A2 is arranged parallel to the rotation axis A1. However, the stopper rotation axis A2 may be arranged non-parallel to the rotation axis A1.

Figure 5:
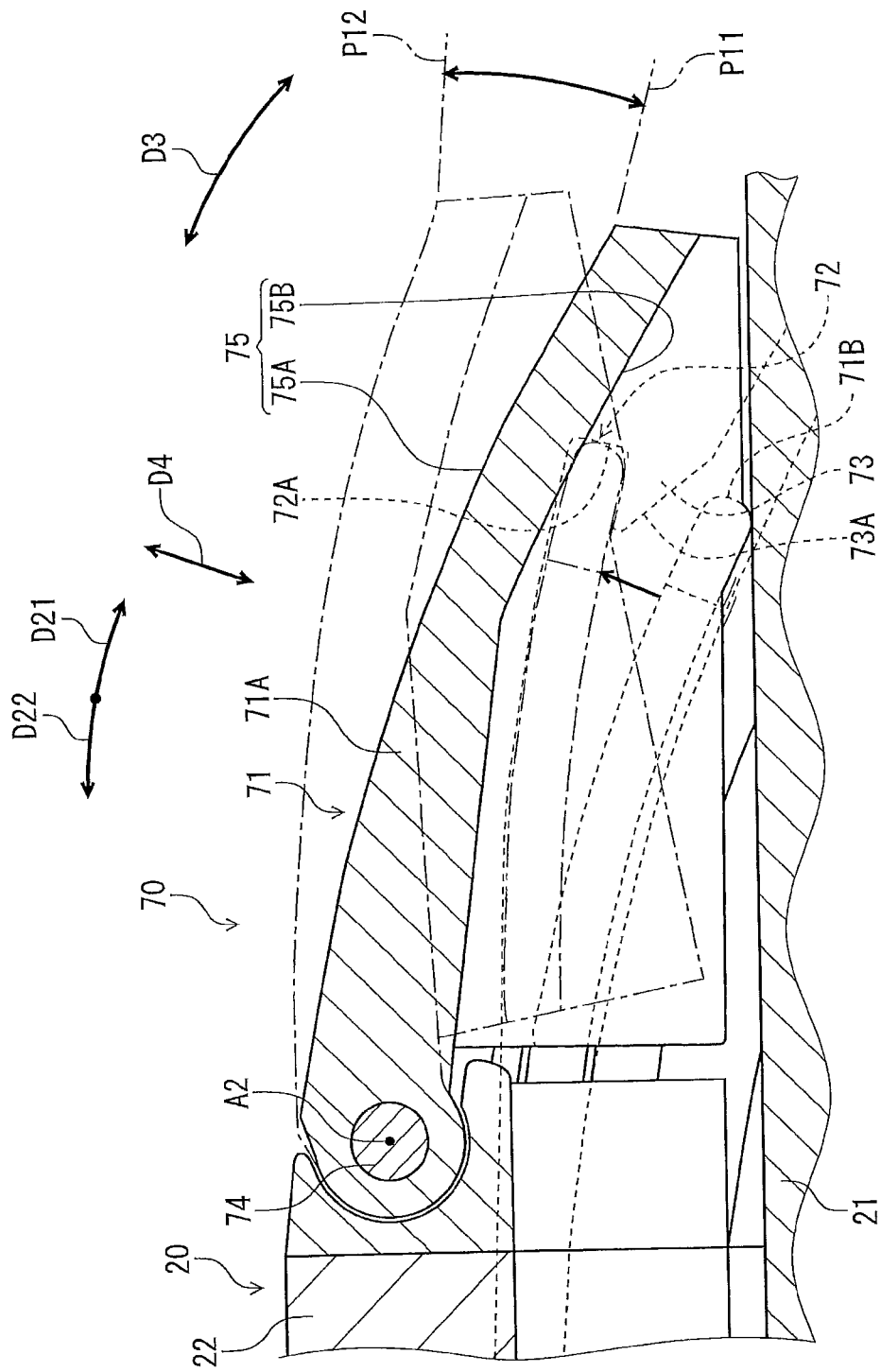
FIG. 5 is a cross-sectional view of the stopper structure illustrated in FIG. 3.

As illustrated in FIG. 5, the movable member 71 can move relative to the second case 20 between a first radial position P11 and a second radial position P12 in a radial direction D4 orthogonal to the rotation axis A1. The movable member 71 can rotate relative to the second case 20 about the stopper rotation axis A2 between the first radial position P11 and the second radial position P12. The second radial position P12 is arranged radially outwardly with respect to the first radial position P11. However, the second radial position P12 may be arranged radially inwardly with respect to the first radial position P11.

Figure 6:
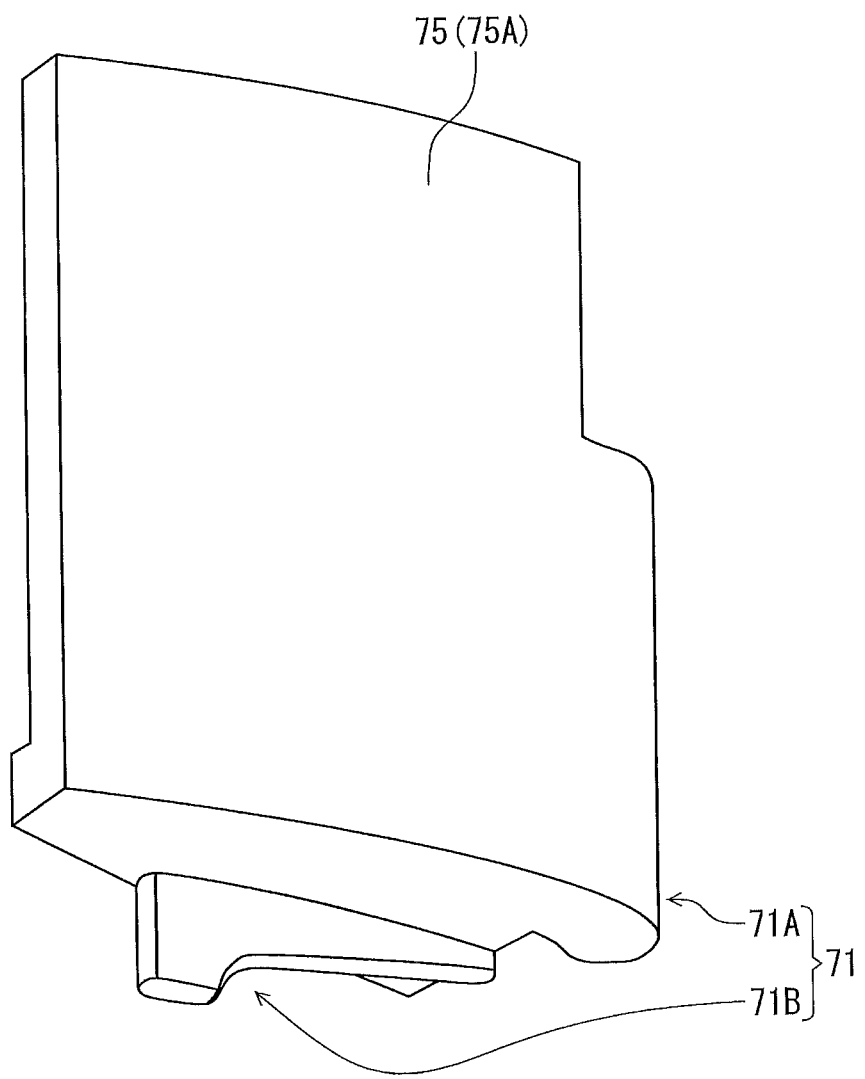
FIG. 6 is a perspective view of a movable member of the stopper structure illustrated in FIG. 3.
Figure 7:
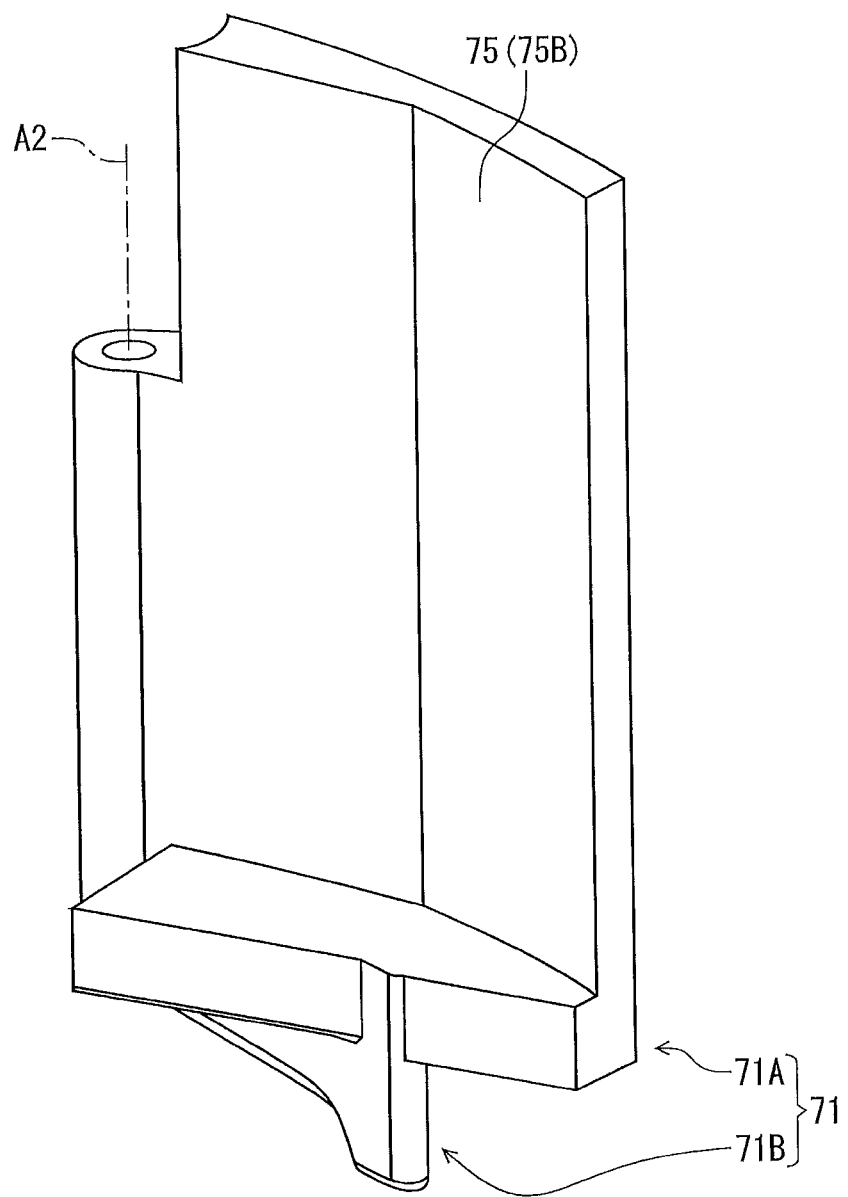
FIG. 7 is a perspective view of the movable member of the stopper structure illustrated in FIG. 3.

As illustrated in FIGS. 6 and 7, the stopper main body 71A includes a cable contact surface 75. The cable contact surface 75 is contactable with the electrical cable 60 to receive a radial force from the electrical cable 60 depending on the state of the electrical cable 60 (see, e.g., FIG. 2). In the present embodiment, the cable contact surface 75 includes a first cable contact surface 75A and a second cable contact surface 75B.

As illustrated in FIG. 5, the second cable contact surface 75B is arranged on a back side of the first cable contact surface 75A. The second cable contact surface 75B is arranged radially inwardly of the first cable contact surface 75A. The first cable contact surface 75A is configured to face radially outwardly in a state where the movable member 71 is at the first radial position P11. The second cable contact surface 75B is configured to face radially inwardly in a state where the movable member 71 is at the first radial position P11. The first cable contact surface 75A is contactable with the electrical cable 60 to receive a biasing force radially inwardly from the electrical cable 60. The second cable contact surface 75B is contactable with the electrical cable 60 to receive the biasing force radially outwardly from the electrical cable 60.

The protruding portion 71B is provided radially inwardly with respect to the cable contact surface 75 when viewed along the rotation axis A1. The protruding portion 71B is provided radially inwardly with respect to the first cable contact surface 75A when viewed along the rotation axis A1. The protruding portion 71B is provided radially inwardly with respect to the second cable contact surface 75B when viewed along the rotation axis A1. However, the protruding portion 71B may be provided at the same radial position as the cable contact surface 75 or provided radially outwardly with respect to the cable contact surface 75 when viewed along rotation axis A1.

Figure 8:
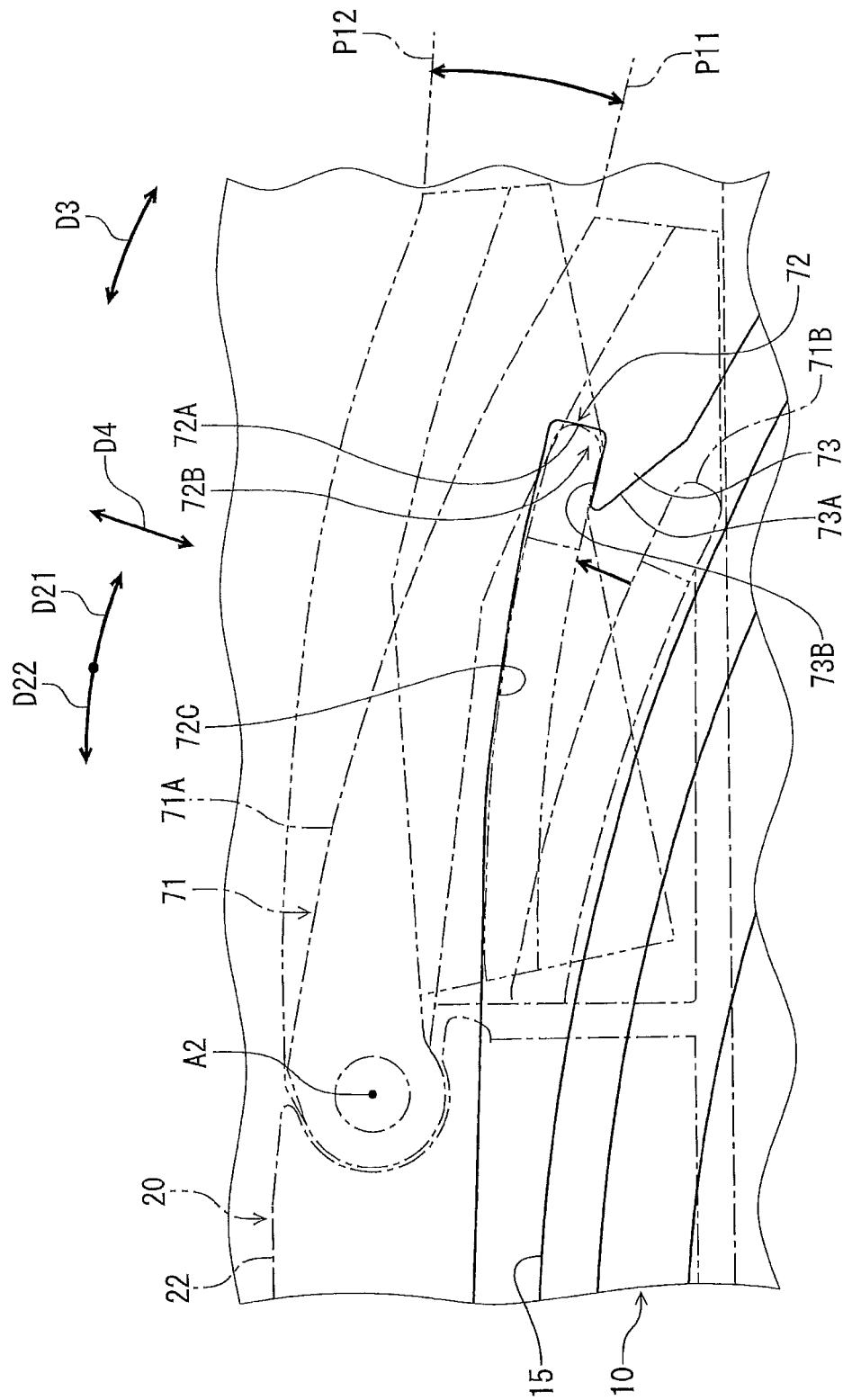
FIG. 8 is a plan view of the stopper structure illustrated in FIG. 3.

As illustrated in FIG. 8, the rotation restricting portion 72 is contactable with the movable member 71 in the circumferential direction D3 to restrict the rotation of the first case 10 and the second case 20 relative to each other, in a state where the movable member 71 is at the second radial position P12. The protruding portion 71B is contactable with the rotation restricting portion 72 in the circumferential direction D3. The rotation restricting portion 72 includes a stopper surface 72A that is contactable with the movable member 71 in the circumferential direction D3. The stopper surface 72A is arranged to face in the circumferential direction D3. The stopper surface 72A is arranged to face in the second rotational direction D22.

In a state where the movable member 71 is at the second radial position P12, the protruding portion 71B is contactable with the rotation restricting portion 72 in the circumferential direction D3. In a state where the movable member 71 is at the second radial position P12, the radial position of the protruding portion 71B is approximately the same as the radial position of the rotation restricting portion 72.

The protruding portion 71B is arranged at a position away from the rotation restricting portion 72 in the radial direction in a state where the movable member 71 is at the first radial position P11. In a state where the movable member 71 is at the first radial position P11, the radial position of the protruding portion 71B is different from the radial position of the rotation restricting portion 72. In the present embodiment, in a state where the movable member 71 is at the first radial position P11, the protruding portion 71B is arranged radially inwardly with respect to the rotation restricting portion 72. However, in a state where the movable member 71 is at the first radial position P11, the protruding portion 71B may be arranged radially outwardly with respect to the rotation restricting portion 72.

The first case 10 includes an annular groove 15. The protruding portion 71B is arranged in the annular groove 15 in a state where the movable member 71 is at the first radial position P11. Thus, in a state where the movable member 71 is at the first radial position P11, the second case 20 is rotatable relative to the first case 10 in the first rotational direction D21 and the second rotational direction D22. When the second case 20 rotates relative to the first case 10 in the first rotational direction D21 in a state where the movable member 71 is radially outwardly biased, the protruding portion 71B of the movable member 71 contacts the stopper surface 72A of the rotation restricting portion 72, and rotation of the second case 20 relative to the first case 10 in the first rotational direction D21 stops. On the other hand, since the stopper surface 72A is facing in the second rotational direction D22, even when the second case 20 rotates relative to the first case 10 in the second rotational direction D22 in a state where the movable member 71 is radially outwardly biased, rotation of the second case 20 relative to the first case 10 in the second rotational direction D22 is not limited.

Figure 9:
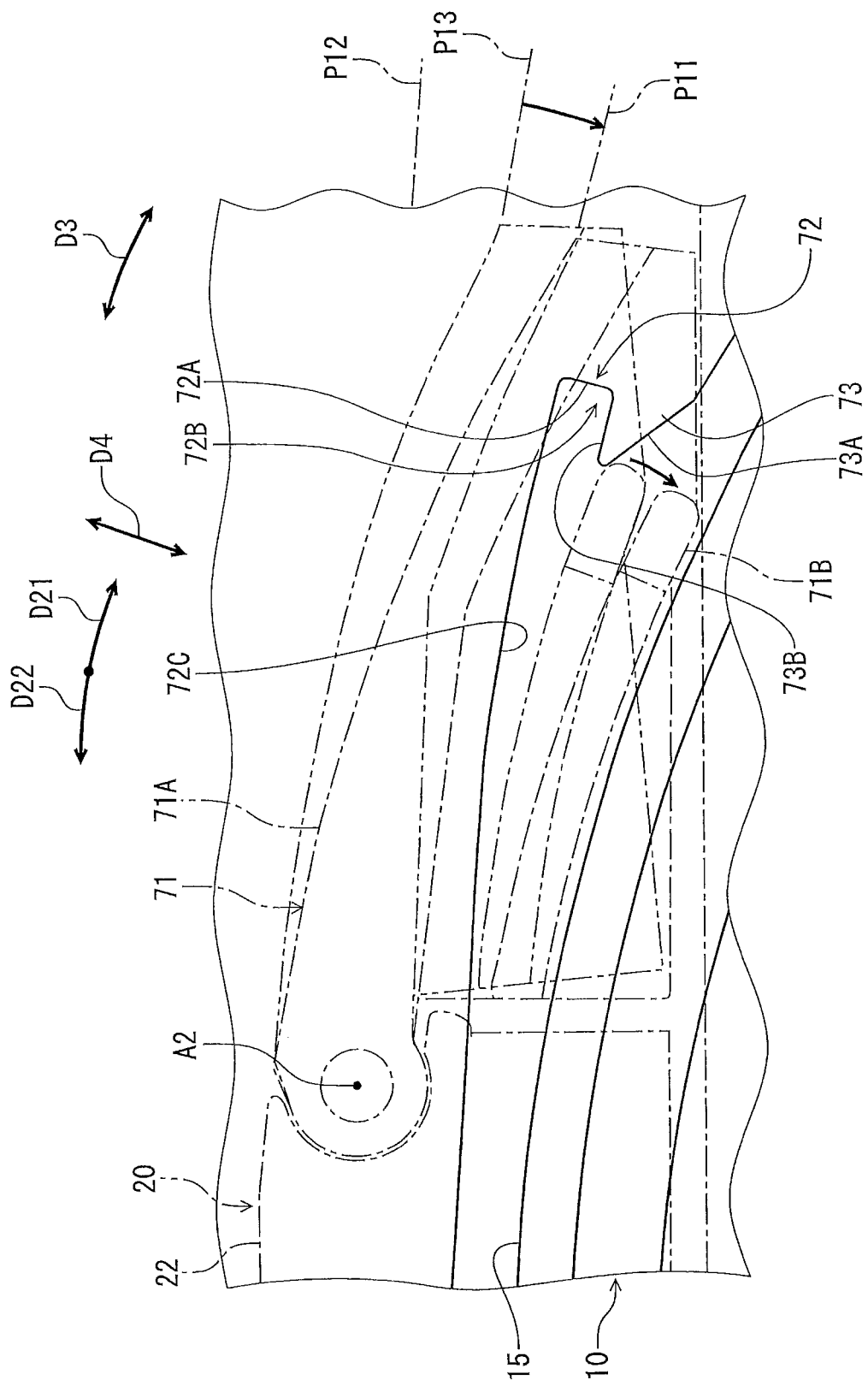
FIG. 9 is a plan view of the stopper structure illustrated in FIG. 3.

As illustrated in FIG. 9, the guide portion 73 is contactable with the movable member 71 to guide the movable member 71 toward the first radial position P11. For example, in a state where the movable member 71 is at an intermediate position P13, which is approximately midway between the first radial position P11 and the second radial position P12, the guide portion 73 is contactable with the movable member 71 to guide the movable member 71 toward the first radial position P11. In a state where the movable member 71 is between the first radial position P11 and the intermediate position P13, the guide portion 73 is contactable with the movable member 71 to guide the movable member 71 toward the first radial position P11.

The rotation restricting portion 72 is arranged radially outwardly of the guide portion 73. The guide portion 73 protrudes from the stopper surface 72A in the circumferential direction D3. The guide portion 73 includes a guide surface 73A that inclines relative to the circumferential direction D3 when viewed along the rotation axis A1. The guide surface 73A is arranged to face radially inwardly. However, the guide portion 73 needs not to protrude from the stopper surface 72A in the circumferential direction D3. The guide surface 73A may be configured to extend radially inwardly from the stopper surface 72A. In the present embodiment, the guide surface 73A is a flat surface, but may be a curved surface.

The guide portion 73 is configured to restrict the movable member 71 from moving toward the first radial position P11 in a state where the movable member 71 is at the second radial position P12. The stopper structure 70 includes a stopper groove 72B defined by the rotation restricting portion 72 and the guide portion 73. In a state where the movable member 71 is in contact with the rotation restricting portion 72, the movable member 71 is at least partially inserted into the stopper groove 72B. In a state where the protruding portion 71B is in contact with the rotation restricting portion 72, the protruding portion 71B is partially inserted into the stopper groove 72B. When the guide portion 73 does not protrude from the stopper surface 72A in the circumferential direction D3, the stopper groove 72B may be omitted.

In the present embodiment, the guide portion 73 includes a restricting surface 73B. The restricting surface 73B is arranged to face radially outwardly. The restricting surface 73B is provided on a back side of the guide surface 73A. The restricting surface 73B extends from the stopper surface 72A in the circumferential direction D3. The rotation restricting portion 72 includes a lead-in surface 72C configured to lead in the protruding portion 71B to the stopper surface 72A. The lead-in surface 72C extends from the stopper surface 72A in the circumferential direction D3. The restricting surface 73B extends from the lead-in surface 72C in the circumferential direction D3 and is arranged by spacing from the lead-in surface 72C in the radial direction. The stopper surface 72A, the lead-in surface 72C and the restricting surface 73B constitutes the stopper groove 72B.

Figure 10:
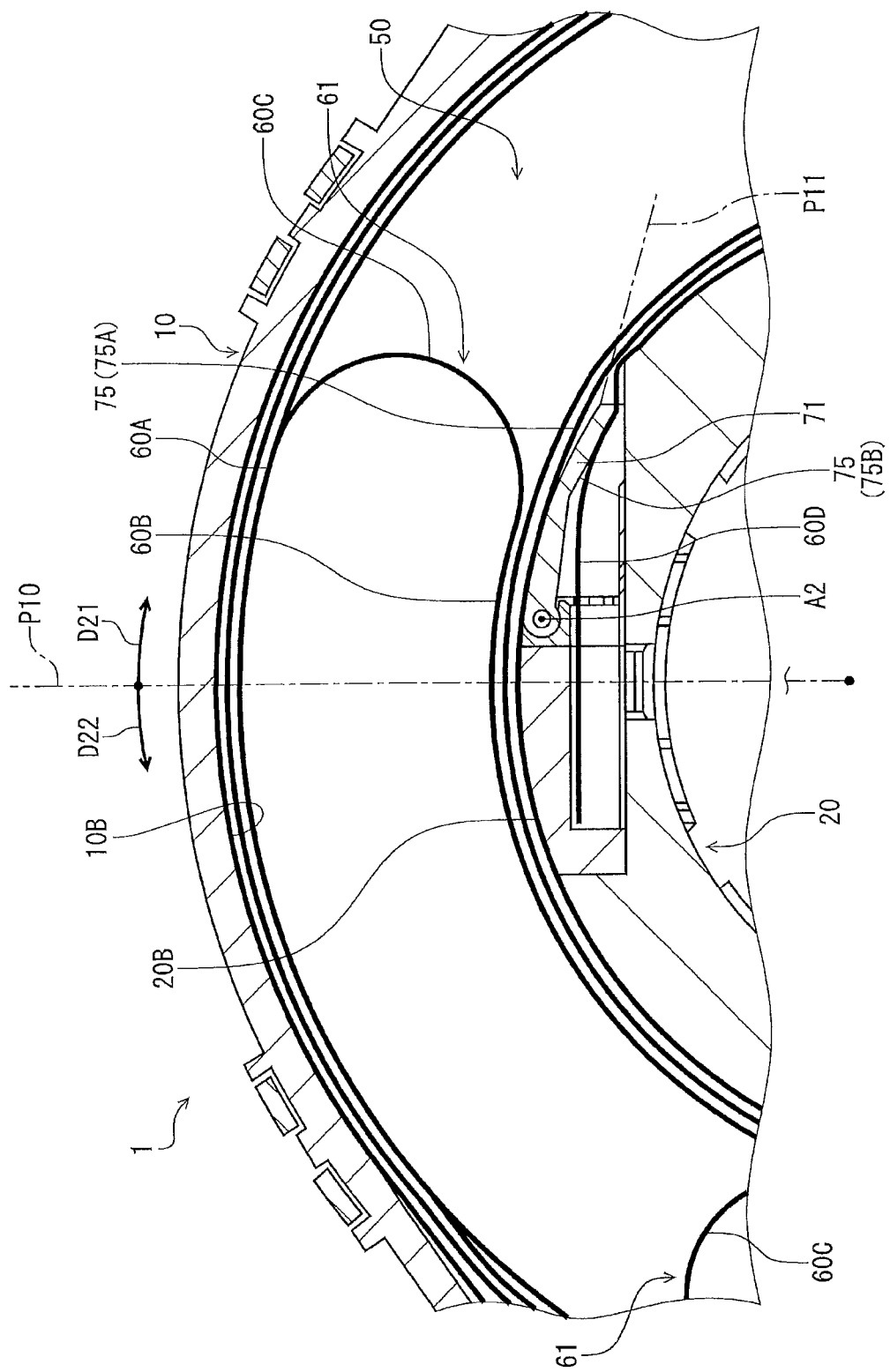
FIG. 10 is an explanatory diagram illustrating the operation of the stopper structure illustrated in FIG. 3.
Figure 11:
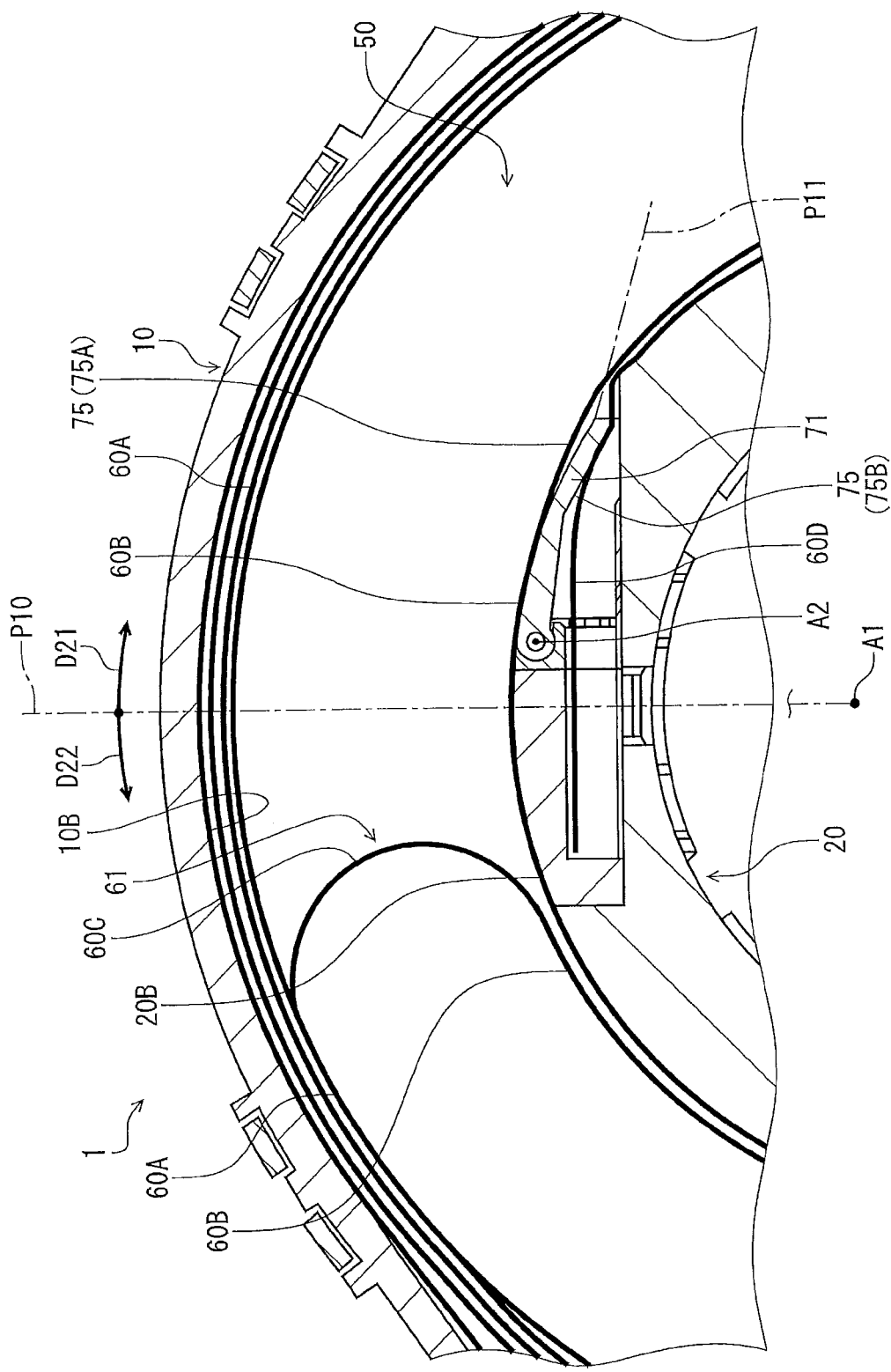
FIG. 11 is an explanatory diagram illustrating the operation of the stopper structure illustrated in FIG. 3.
Figure 12:
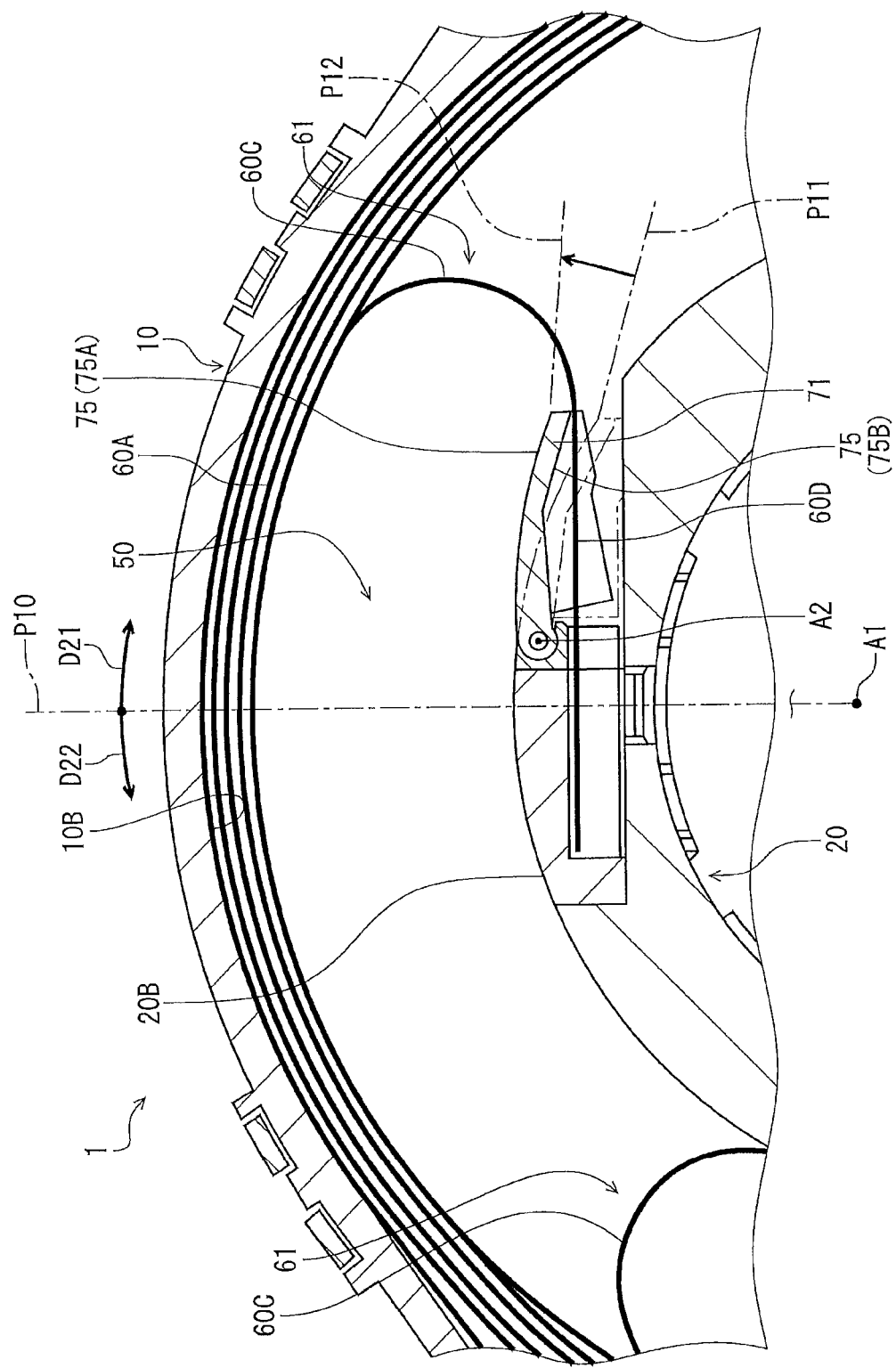
FIG. 12 is an explanatory diagram illustrating the operation of the stopper structure illustrated in FIG. 3.

FIG. 10 illustrates a state where the second case 20 is at a neutral position P10 relative to the first case 10. FIG. 11 illustrates a state where the second case 20 has rotated 360 degrees relative to the first case 10 from the neutral position P10 in the first rotational direction D21. FIG. 12 illustrates a state where the second case 20 has rotated 720 degrees relative to the first case 10 from the neutral position P10 in the first rotational direction D21. The electrical cable 60 includes 4 flat cables 61 but is illustrated in simplified form in FIGS. 10 to 12.

As illustrated in FIG. 10, in a state where the second case 20 is at the neutral position P10 relative to the first case 10, the second winding portion 60B of the electrical cable 60 is wound about the outer peripheral surface 20B two or three times, and thus the movable member 71 is biased radially inwardly by the electrical cable 60. On the other hand, the movable member 71 is biased radially outwardly by a lead-out portion 60D of the electrical cable 60, but the winding number of the second winding portion 60B arranged radially outwardly of the movable member 71 is larger than the winding number of the lead-out portion 60D arranged radially inwardly of the movable member 71. Thus, in a state where the second case 20 is at the neutral position P10 relative to the first case 10, the movable member 71 is held at the first radial position P11 by the biasing force of the electrical cable 60.

As illustrated in FIGS. 10 to 12, the movable member 71 can move to the first radial position P11 and the second radial position P12 depending on the state of the electrical cable 60. When the second case 20 rotates relative to the first case 10 in the first rotational direction D21, the biasing force of the electrical cable 60 that biases the movable member 71 toward the first radial position P11 decreases. When the second case 20 rotates relative to the first case 10 in the second rotational direction D22, the biasing force of the electrical cable 60 that biases the movable member 71 toward the first radial position P11 increases.

Specifically, as described above, when the second case 20 rotates relative to the first case 10 in the first rotational direction D21, the length of the second winding portion 60B of the electrical cable 60 wound about the outer peripheral surface 20B decreases. On the other hand, when the second case 20 rotates relative to the first case 10 in the first rotational direction D21, the length of the first winding portion 60A of the electrical cable 60 wound about the inner peripheral surface 10B increases by the amount of the decreasing length of the second winding portion 60B wound about the outer peripheral surface 20B.

As illustrated in FIG. 11, when the second case 20 rotates 360 degrees relative to the first case 10 from the neutral position P10 in the first rotational direction D21, the winding number of the second winding portion 60B wound about the outer peripheral surface 20B decreases compared to that of the neutral position P10. This weakens the biasing force of the electrical cable 60 which is radially inwardly directed, and there is a possibility that the movable member 71 may contact the rotation restricting portion 72 in an unintended state due to the minute movement of the movable member 71 relative to the second case 20 caused by individual differences or dimensional errors in the product.

However, as illustrated in FIG. 9, for example, in a state where the movable member 71 is between the first radial position P11 and the intermediate position P13, the protruding portion 71B of the movable member 71 contacts the guide surface 73A of the guide portion 73. Thus, the movable member 71 is guided toward the first radial position P11, which suppresses the stopper structure 70 from restricting the rotation of the second case 20 relative to the first case 10 in the first rotational direction D21. That is, the stopper structure 70 does not operate at the degree of the relative rotation angle illustrated in FIG. 11.

As illustrated in FIG. 12, when the second case 20 rotates 720 degrees in the first rotational direction D21 from the neutral position P10 relative to the first case 10, the winding number of the second winding portion 60B wound about the outer peripheral surface 20B further decreases compared to that of the rotation by 360 degrees from the neutral position P10. In the present embodiment, when the second case 20 rotates 720 degrees from the neutral position P10 in the first rotational direction D21 relative to the first case 10, the winding number of the second winding portion 60B wound about the outer peripheral surface 20B becomes zero. On the other hand, the lead-out portion 60D of the electrical cable 60 radially outwardly biases the movable member 71.

As illustrated in FIGS. 5 and 12, when the second case 20 further rotates relative to the first case 10 in a state where the movable member 71 is radially outwardly biased by the lead-out portion 60D of the electrical cable 60, the protruding portion 71B of the movable member 71 contacts the stopper surface 72A of the rotation restricting portion 72 and the rotation of the second case 20 relative to the first case 10 in the first rotational direction D21 stops. In the present embodiment, for example, the rotation angle of the second case 20 in the first rotational direction D21 relative to the first case 10 is limited to approximately 720 degrees by the stopper structure 70.

On the other hand, when the second case 20 rotates relative to the first case 10 in the second rotational direction D22, the length of the second winding portion 60B of the electrical cable 60 wound about the outer peripheral surface 20B increases, and thus the movable member 71 is retained in the first radial position P11. Also, as illustrated in FIG. 8, since the stopper surface 72A faces in the second rotational direction D22, even when the second case 20 rotates in the second rotational direction D22 relative to the first case 10, the protruding portion 71B of the movable member 71 does not contact the stopper surface 72A of the rotation restricting portion 72. Consequently, when the second case 20 rotates in the second rotational direction D22 relative to the first case 10, the stopper structure 70 does not operate. In this case, when the second case 20 rotates in the second rotational direction D22 relative to the first case 10, rotation of the second case 20 relative to the first case 10 stops in a state where electrical cable 60 is pulled between the first case 10 and the second case 20.

Aspects of the rotary connector device 1 are summarized below.

(1) The rotary connector device 1 includes the first case 10, the second case 20, an electrical cable 60, and the stopper structure 70. The first case 10 and the second case 20 are rotatably provided relative to each other about the rotation axis A1 and defines the cable housing space 50 provided to surround the rotation axis A1. The electrical cable 60 is provided in the cable housing space 50 to be wound in the circumferential direction D3 defined about the rotation axis A1. The stopper structure 70 is configured to restrict a relative rotation of the first case 10 and the second case 20 to a predetermined rotation angle. The stopper structure 70 includes the movable member 71, the rotation restricting portion 72, and the guide portion 73. The movable member 71 is movable relative to the second case 20 between the first radial position P11 and the second radial position P12 in a radial direction orthogonal to the rotation axis A1. The rotation restricting portion 72 is provided at the first case 10 and, contactable with the movable member 71 in the circumferential direction D3 to restrict the relative rotation of the first case 10 and the second case 20 in a state where the movable member 71 is at the second radial position P12. The guide portion 73 is provided at the first case 10 and contactable with the movable member 71 to guide the movable member 71 toward the first radial position P11.

In the rotary connector device 1, for example, when the movable member 71 contacts the guide portion 73 in a state where the movable member 71 is at a position other than the second radial position P12, the guide portion 73 guides the movable member 71 toward the first radial position P11. Consequently, this can suppress from the movable member 71 contacting the rotation restricting portion 72 in an unintended state to restrict the relative rotation of the first case 10 and the second case 20, due to the minute movement of the movable member 71 relative to the second case 20 caused by individual differences or dimensional errors in the product or the like. That is, malfunctions of the stopper structure 70, which is caused by individual differences or dimensional errors in the product or the like, is suppressed.

(2) The rotation restricting portion 72 is arranged radially outwardly of the guide portion 73. This allows a greater rotational force to be received at the rotation restricting portion 72, which increases the mechanical strength of the stopper structure 70.

(3) The rotation restricting portion 72 includes the stopper surface 72A contactable with the movable member 71 in the circumferential direction D3. The guide portion 73 protrudes from the stopper surface 72A in the circumferential direction D3. Thus, the guide portion 73 can reliably guide the movable member 71 toward the first radial position P11.

(4) The guide portion 73 includes the guide surface 73A inclined relative to the circumferential direction D3 when viewed along the rotation axis A1. Thus, the guide surface 73A can more reliably guide the movable member 71 toward the first radial position P11.

(5) The guide portion 73 is configured to restrict the movable member 71 from moving toward the first radial position P11 in a state where the movable member 71 is at the second radial position P12. Thus, for example, in a state where the movable member 71 is in contact with the rotation restricting portion 72 at the second radial position P12, the contact state between the movable member 71 and the rotation restricting portion 72 can be stabilized.

(6) The stopper structure 70 includes the stopper groove 72B into which the movable member 71 is at least partially inserted in a state where the movable member 71 is in contact with the rotation restricting portion 72. Thus, for example, the contact state between the movable member 71 and the rotation restricting portion 72 can be more stabilized in a state where the movable member 71 is in contact with the rotation restricting portion 72 at the second radial position P12.

(7) The movable member 71 includes a stopper main body 71A coupled to the second case 20 rotatably about a stopper rotation axis A2, and the protruding portion 71B that protrudes from the stopper main body 71A in the axial direction D1 defined along the rotation axis A1 and is contactable with the rotation restricting portion 72 in the circumferential direction D3. Thus, the shape and position of the protruding portion 71B are less affected by the shape and position of the stopper main body 71A, and the degree of freedom in designing the movable member 71 is increased.

(8) The stopper main body 71A includes the cable contact surface 75 that is contactable with the electrical cable 60 to receive the radial force from the electrical cable 60 depending on the state of the electrical cable 60. Thus, the electrical cable 60 can be used to move the movable member 71 in the radial direction, thereby simplifying the structure.

(9) The protruding portion 71B is provided radially inwardly with respect to the cable contact surface 75 when viewed along the rotation axis A1. Thus, the protruding portion 71B can be arranged outside the cable housing space 50.

(10) The protruding portion 71B is arranged at a position away from the rotation restricting portion 72 in the radial direction in a state where the movable member 71 is at the first radial position P11. Thus, unintended contact of the movable member 71 with the rotation restricting portion 72 can be reliably suppressed.

(11) The movable member 71 is movable to the first radial position P11 and the second radial position P12 depending on the state of the electrical cable 60. Thus, the electrical cable 60 can be used to move the movable member 71 toward the first radial position P11 and the second radial position P12, thereby simplifying the structure.

(12) The first case 10 includes an inner peripheral surface partially defining the cable housing space 50. The second case 20 includes an outer peripheral surface provided radially inwardly of the inner peripheral surface and partially defining the cable housing space 50. The electrical cable 60 includes a first winding portion wound along the inner peripheral surface of the first case 10, a second winding portion wound along the outer peripheral surface of the second case 20, and an intermediate portion provided between the first winding portion and the second winding portion and coupling the first winding portion to the second winding portion. The electrical cable 60 is provided in the cable housing space 50 such that rotation of the second case 20 relative to the first case 10 in the first rotational direction D21 decreases the length of the second winding portion of the electrical cable 60 wound about the outer peripheral surface. The electrical cable 60 is provided in the cable housing space 50 such that rotation of the second case 20 relative to the first case 10 in the second rotational direction D22 opposite to the first rotational direction D21 increases the length of the second winding portion of the electrical cable 60 wound about the outer peripheral surface. The rotation of the second case 20 relative to the first case 10 in the first rotational direction D21 decreases a biasing force of the electrical cable 60 biasing the movable member 71 toward the first radial position P11. The rotation of the second case 20 relative to the first case 10 in the second rotational direction D22 increases the biasing force of the electrical cable 60 biasing the movable member 71 toward the first radial position P11. Consequently, the relative rotation of the first case 10 and the second case 20 can be used to move the movable member 71 toward the first radial position P11 and the second radial position P12, thereby simplifying the structure.

(13) The first case 10 is a stator configured to be secured to the vehicle body. The second case 20 is a rotator rotatable about the rotation axis A1 relative to the stator 10. The movable member 71 is coupled to the rotator rotatably about the stopper rotation axis A2. The rotation restricting portion 72 is provided at the stator 10. Thus, a greater rotational force can be received by the rotation restricting portion 72 provided at the stator 10, which increases the mechanical strength of the stopper structure 70.

It should be noted that, in the present application, "comprise" and its derivatives are open-ended terms describing the presence of a component and do not exclude the presence of other components not described. This also applies to "have", "include" and their derivatives.

In the present application, ordinal numbers such as "first" and "second" are merely terms used to identify a configuration and do not have any other meaning (e.g., a specific order or the like). For example, the presence of "first element" does not imply the presence of "second element", and the presence of "second element" does not imply the presence of the "first element".

Expressions such as "parallel", "orthogonal", and "identical" in the present disclosure should not be interpreted strictly and include respectively the meanings of "substantially parallel", "substantially orthogonal", and "substantially identical". In addition, other expressions related to the arrangement are not strictly construed.

The expression "at least one of A and B" in the present disclosure also includes, for example, all of (1) only A, (2) only B, and (3) both A and B. The expression "at least one of A, B and C" includes, for example, all of (1) only A, (2) only B, (3) only C, (4) A and B, (5) B and C, (6) A and C, and (7) A, B and C. In the present disclosure, the expression "at least one of A and B" is not construed as "at least one of A and at least one of B".

It is apparent from the above disclosure that various changes and modifications of the disclosure are possible. Accordingly, the disclosure may be implemented in a manner different from the specific disclosure of the present application without departing from the spirit of the disclosure.

What is claimed is:

1. A rotary connector device comprising:
a first case;
a second case, the first case and the second case being rotatably provided relative to each other about a rotation axis and defining a cable housing space provided to surround the rotation axis;
an electrical cable provided in the cable housing space to be wound in a circumferential direction defined about the rotation axis;
a stopper structure to restrict a relative rotation of the first case and the second case to a predetermined rotation angle; and
the stopper structure comprising:
a movable member movable relative to the second case between a first radial position and a second radial position in a radial direction orthogonal to the rotation axis;
a rotation restricting portion provided at the first case and contactable with the movable member in the circumferential direction to restrict the relative rotation of the first case and the second case in a state where the movable member is at the second radial position; and
a guide portion provided at the first case and contactable with the movable member to guide the movable member toward the first radial position.

2. The rotary connector device according to claim 1, wherein
the rotation restricting portion is arranged radially outwardly of the guide portion.

3. The rotary connector device according to claim 1, wherein
the rotation restricting portion includes a stopper surface contactable with the movable member in the circumferential direction, and
the guide portion protrudes from the stopper surface in the circumferential direction.

4. The rotary connector device according to claim 1, wherein
the guide portion includes a guide surface inclined relative to the circumferential direction when viewed along the rotation axis.

5. The rotary connector device according to claim 1, wherein
the guide portion is configured to restrict the movable member from moving toward the first radial position in a state where the movable member is at the second radial position.

6. The rotary connector device according to claim 1, wherein
the stopper structure includes a stopper groove into which the movable member is at least partially inserted in a state where the movable member is in contact with the rotation restricting portion.

7. The rotary connector device according to claim 1, wherein
the movable member is movable to the first radial position and the second radial position depending on a state of the electrical cable.

8. The rotary connector device according to claim 1, wherein
the first case includes an inner peripheral surface partially defining the cable housing space,
the second case includes an outer peripheral surface provided radially inwardly of the inner peripheral surface and partially defining the cable housing space,
the electrical cable includes
a first winding portion wound along the inner peripheral surface of the first case,
a second winding portion wound along the outer peripheral surface of the second case, and
an intermediate portion provided between the first winding portion and the second winding portion and coupling the first winding portion to the second winding portion,
the electrical cable is provided in the cable housing space such that rotation of the second case relative to the first case in a first rotational direction decreases a length of the second winding portion of the electrical cable wound about the outer peripheral surface,
the electrical cable is provided in the cable housing space such that rotation of the second case relative to the first case in a second rotational direction opposite to the first rotational direction increases the length of the second winding portion of the electrical cable wound about the outer peripheral surface,
the rotation of the second case relative to the first case in the first rotational direction decreases a biasing force of the electrical cable biasing the movable member toward the first radial position, and
the rotation of the second case relative to the first case in the second rotational direction increases the biasing force of the electrical cable biasing the movable member toward the first radial position.

9. The rotary connector device according to claim 1, wherein
the first case includes a stator to be secured to a vehicle body,
the second case includes a rotator rotatable about the rotation axis relative to the stator,
the movable member is coupled to the rotator rotatably about the stopper rotation axis, and
the rotation restricting portion is provided at the stator.

10. The rotary connector device according to claim 1, wherein
the movable member includes
a stopper main body coupled to the second case rotatably about a stopper rotation axis, and
a protruding portion protruding from the stopper main body in an axial direction defined along the rotation axis, the protruding portion being contactable with the rotation restricting portion in the circumferential direction.

11. The rotary connector device according to claim 10, wherein
the protruding portion is arranged at a position away from the rotation restricting portion in the radial direction in a state where the movable member is at the first radial position.

12. The rotary connector device according to claim 10, wherein
the stopper main body includes a cable contact surface contactable with the electrical cable to receive a radial force from the electrical cable depending on a state of the electrical cable.

13. The rotary connector device according to claim 12, wherein
the protruding portion is provided radially inwardly with respect to the cable contact surface when viewed along the rotation axis.

\* \* \* \* \*